(12) United States Patent
Neviani

(10) Patent No.: US 6,471,595 B1
(45) Date of Patent: Oct. 29, 2002

(54) ROTARY JOINT

(75) Inventor: Claude Neviani, Mezy sur Seine (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/787,330

(22) PCT Filed: Jul. 11, 2000

(86) PCT No.: PCT/FR00/02004

§ 371 (c)(1), (2), (4) Date: Mar. 16, 2001

(87) PCT Pub. No.: WO01/06142

PCT Pub. Date: Jan. 25, 2001

(30) Foreign Application Priority Data

Jul. 19, 1999 (FR) .............................. 99 09346

(51) Int. Cl.[7] ................................. F16D 3/84
(52) U.S. Cl. ....................... 464/175; 277/636
(58) Field of Search ................ 464/111, 173, 464/174, 175, 906; 403/50, 51; 277/634, 635, 636

(56) References Cited

U.S. PATENT DOCUMENTS

| 3,817,057 | A | * | 6/1974 | Orain | ..................... 464/175 X |
| 4,280,340 | A | * | 7/1981 | Goguet | ..................... 464/111 X |
| 4,936,811 | A | * | 6/1990 | Baker | ..................... 464/175 |
| 6,190,260 | B1 | * | 2/2001 | Flores et al. | ............... 464/111 |
| 6,220,969 | B1 | * | 4/2001 | Lilley | ..................... 464/173 |

FOREIGN PATENT DOCUMENTS

| DE | 43 02 432 A1 | 8/1993 |
| FR | 1 514 981 A | 1/1968 |
| FR | 2 651 286 A1 | 3/1991 |
| GB | 2 295 438 A | 5/1996 |

* cited by examiner

Primary Examiner—Greg Binda

(57) ABSTRACT

This transmission joint comprises a first and a second rotary member, a boot (7) connected by a front end region to the first rotary member and by a rear end region (33) to the second rotary member (6), and means for axially retaining the rear end region of the boot with respect to the second rotary member which comprise a retaining enlargement (20) and a groove (38) for housing the retaining enlargement, the rear end region (33) of the boot and the second rotary member having matching transverse outlines of which the directrix curves exhibit points of inflection. The enlargement is situated on the periphery of the second rotary member and spaced axially from the front end (22) of the second rotary member, and the groove (38) is formed on the periphery of the boot.

13 Claims, 5 Drawing Sheets

ROTARY JOINT

BACKGROUND OF THE INVENTION

The present invention relates to a transmission joint of the type comprising a first and a second rotary member, a boot connected by a front end region to the first rotary member and by a rear end region to the second rotary member, and means for axially retaining the rear end region of the boot with respect to the second rotary member which comprise a retaining enlargement and a groove for housing the retaining enlargement, the rear end region of the boot and the second rotary member having matching transverse outlines of which the directrix curves exhibit points of inflection.

The invention applies in particular to tripot constant-velocity transmission joints.

Such joints allow a rotary movement to be transmitted between a first shaft bearing a male element or tripod and a female element or bell housing which rotates as one with, for example, the output side gear of a differential.

The tripod has three arms each bearing a rolling assembly. Each rolling assembly is intended to roll on a pair of tracks formed in the bell housing. The tripod and the bell housing have ternary symmetry.

The rear end region of the boot is slipped over a front end region of the bell housing.

The bell housing is produced in particular by forging and, in cross section, has, in alternation, convex parts and concave or flat parts. The terms "convex" and "concave" are to be understood as meaning with respect to the outside of the bell housing. The convex parts are farther from the longitudinal axis of the bell housing than the concave or flat parts.

The groove that houses the retaining enlargement is therefore made in each of the convex parts from the radially outer surface of the bell housing. The retaining groove therefore extends discontinuously around the periphery of the bell housing.

The enlargement extends peripherally in a corresponding way on the radially inner surface of the boot.

A clamping member clamps the rear end region of the boot onto the front end region of the bell housing, holding the retaining enlargement inside the housing groove.

The housing groove is generally formed in the bell housing by turning. Because of the discontinuous nature of the groove, such a machining operation poses numerous problems including relatively high wear of the cutting tool used, and the difficulty of producing a groove whose various portions are concentric.

Furthermore, the number of portions of the housing groove and their angular extent depends on the number of convex parts of the bell housing and on their angular extent.

Thus, the total angular extent of the retaining housing groove may be relatively small and the axial retention of the rear end of the boot with respect to the bell housing may therefore not be satisfactory.

SUMMARY OF THE INVENTION

The object of the invention is to solve these problems by providing a transmission joint of the aforementioned type that makes it possible to limit the difficulties of machining the bell housing and to increase the angular extent of the groove that houses the retaining enlargement for a given transverse profile of bell housing.

To this end, the subject of the invention is a transmission joint of the aforementioned type, characterized in that the enlargement is situated on the periphery of the second rotary member and spaced axially from the front end of the second rotary member and in that the groove is formed on the periphery of the boot.

According to particular embodiments, the transmission joint may include one or more of the following features, taken in isolation or in any technically feasible combination:

- the retaining enlargement and the groove that houses the retaining enlargement have roughly matching longitudinal profiles,
- the retaining enlargement extends discontinuously around the periphery of the second rotary member,
- the retaining enlargement comprises several portions spaced roughly regularly about the periphery of the second rotary member,
- the groove that houses the retaining enlargement extends around the periphery of the boot in a similar way to the retaining enlargement around the periphery of the second rotary member,
- the boot comprises sealing means located axially on the same side with respect to at least part of the groove that houses the retaining enlargement,
- the sealing means are located axially on the same side with respect to the entirety of the groove that houses the retaining enlargement,
- the sealing means are located axially to the rear of said part of or the entirety of the groove that houses the retaining enlargement,
- the sealing means are located radially on the same side of the boot as the housing groove,
- it comprises a member for clamping the rear end of the boot onto the second rotary member,
- the clamping member is located axially, with respect to at least part of the groove that houses the retaining enlargement, on the same side as the boot sealing means,
- the retaining enlargement is situated on a radially outer surface of the second rotary member and in that the housing groove is formed on a radially inner surface of the boot,
- the retaining enlargement is formed on the second rotary member by upsetting the material of the second rotary member.

BRIEF DESCRIPTION OF THE DRAWINGS

The present invention will be better understood from reading the description which will follow, given merely by way of example and made with reference to the appended drawings in which.

DETAILED DESCRIPTION OF THE INVENTION

Figure 1:
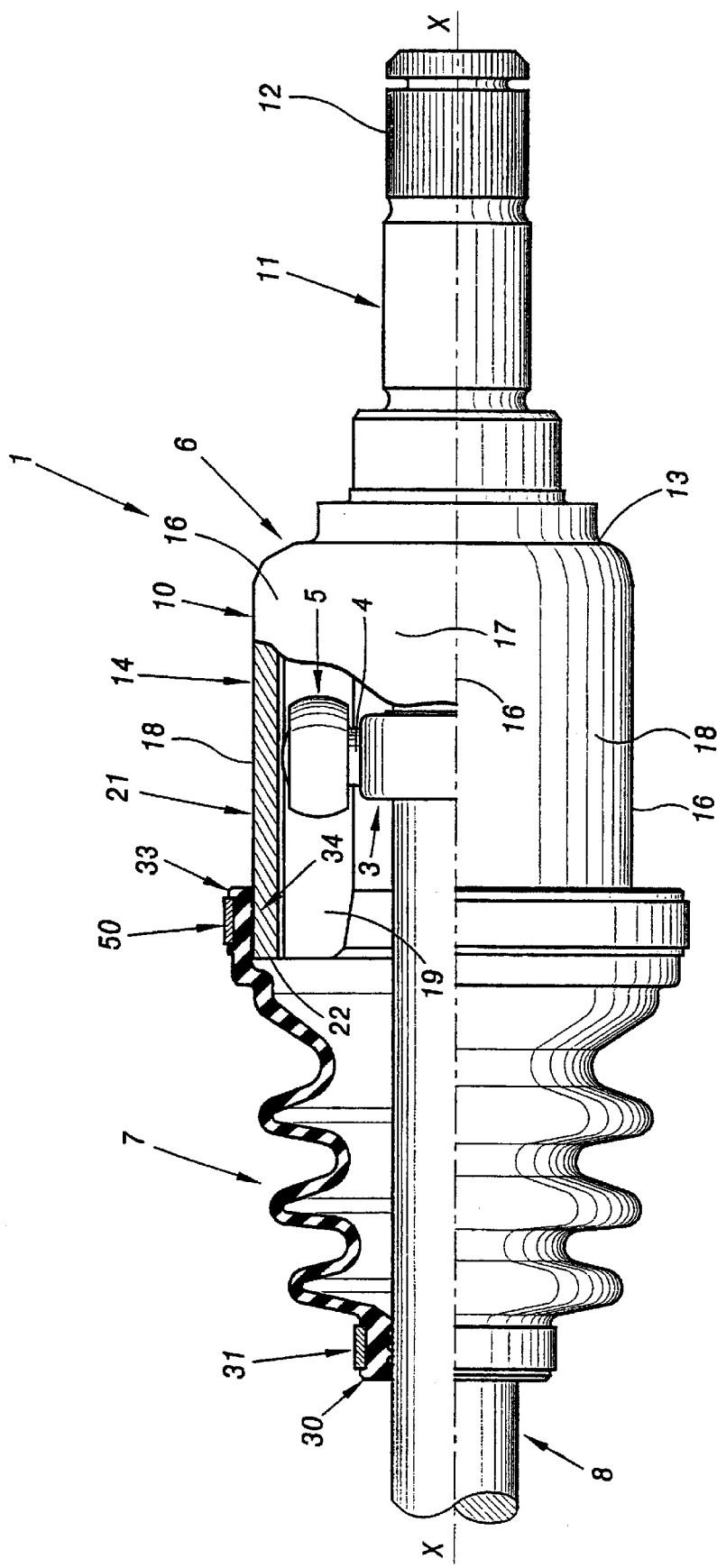
FIG. 1 is a longitudinal diagrammatic view in partial section of a transmission joint according to the invention.

FIG. 1 illustrates a tripot constant-velocity joint 1.

This joint 1, with ternary symmetry about an axis X—X in its aligned position depicted in FIG. 1, essentially comprises:

- a male element or tripod 3 comprising three arms 4 distributed angularly 120° apart and each bearing a rolling assembly 5,
- a female element or bell housing 6, and
- an elastic boot 7.

The tripod 3 is borne by a rotary shaft 8.

The bell housing 6 comprises a body 10 extended to the rear (to the right in FIG. 1) by a shank 11 intended to be connected, by splines 12, for example, to the shaft of an output side gear of a differential, not depicted.

The body 10 comprises a bottom end 13 which bears the shank 11 and which is extended forward by a sidewall 14.

Figure 2:
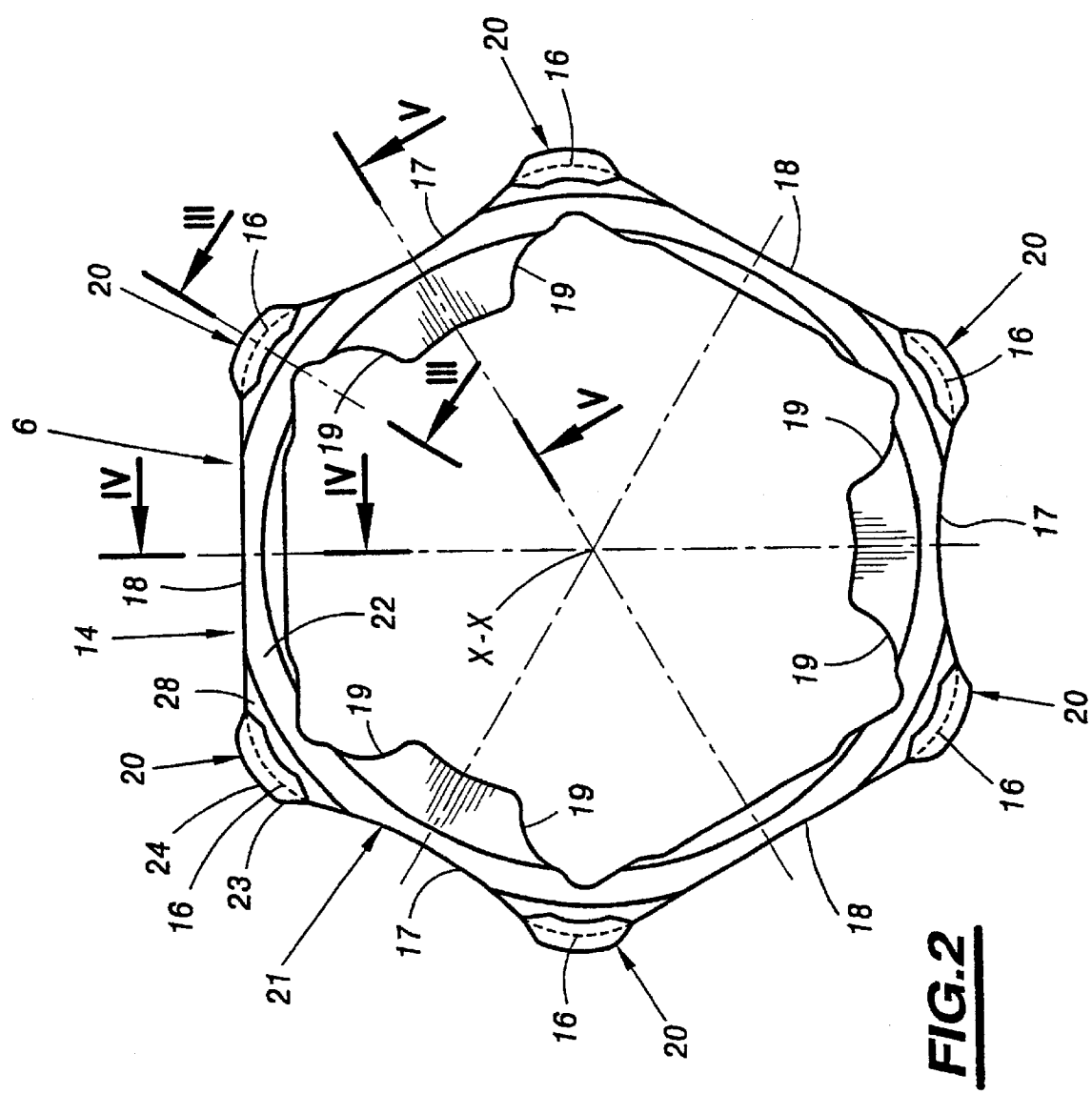
FIG. 2 is a front view illustrating the transverse profile of the bell housing of the joint of FIG. 1, FIGS. 3 to 5 are enlarged diagrammatic part views in section on III—III, IV—IV and V—V, respectively, of FIG. 2.

As can be seen in FIG. 2, the wall 14 has a cylindrical transverse outline with respect to the longitudinal axis X—X of the bell housing 6, whose directrix curve exhibits points of inflection. Thus, the wall 14 has six convex parts 16, three concave parts 17 and three flat parts 18.

The terms "convex" and "concave" are to be understood as meaning with respect to the outside of the bell housing 6.

The exterior transverse outline of the convex parts 16 over most of the axial length of the wall 14 is depicted in dotted line in FIG. 2.

The convex parts 16 are distributed at regular angles about the longitudinal axis X—X. These convex parts 16 are joined together alternately by the convex parts 17 and flat parts 18.

Each convex part 16 is farther from the longitudinal axis X—X of the bell housing 6 than the concave parts 17 and flat parts 18.

The convex parts 16 connected by one and the same flat part 18 internally delimit a pair of tracks 19 on which a rolling assembly 5 is intended to run.

A discontinuous peripheral enlargement 20 of axis X—X projects from the radially outer surface 21 of the sidewall 14 of the bell housing 6. The enlargement 20 is spaced axially a short distance away from the front edge face or end 22 of the bell housing 6.

The enlargement 20 has a portion 23 at each convex part 16.

Figure 4:
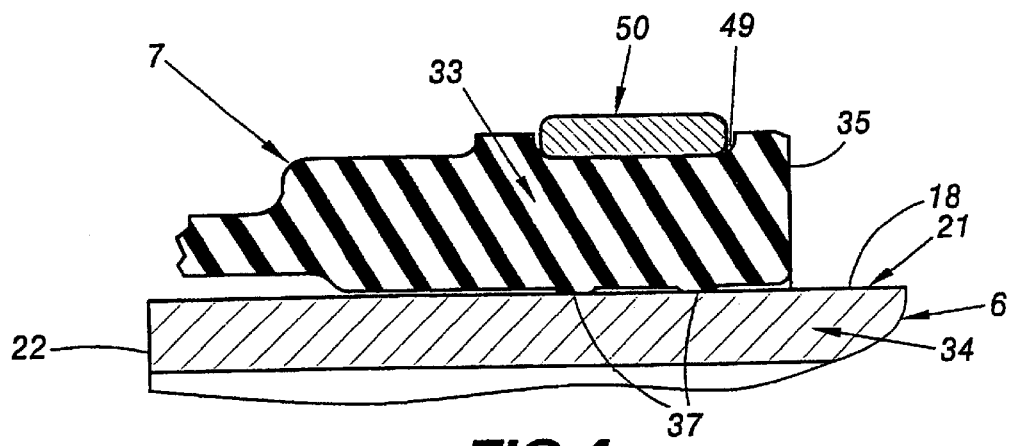
Figure 5:
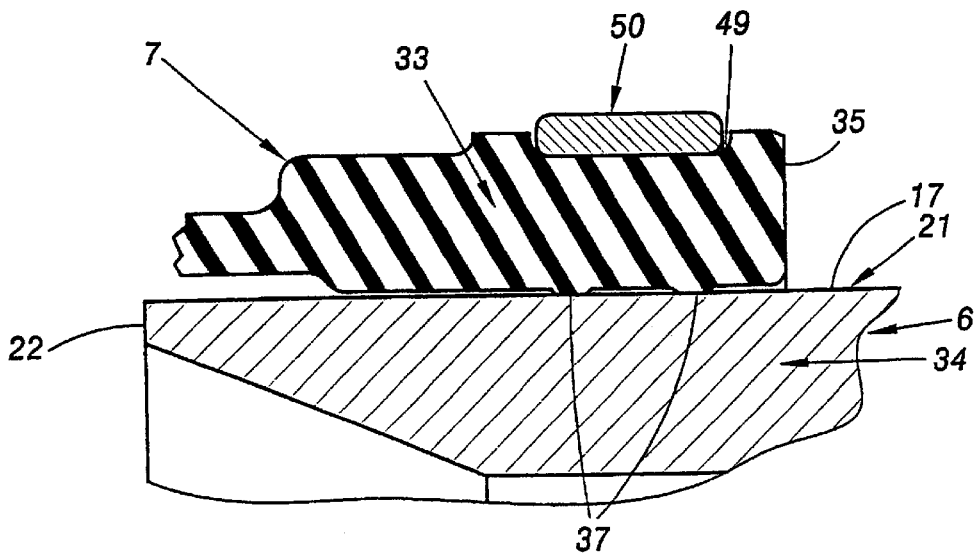

The enlargement 20 is interrupted at each concave part 17 or flat part 18 of the sidewall 14 of the bell housing 6 as can be seen in FIGS. 2, 4 and 5. The top 24 of this enlargement 20 belongs to a cylinder of circular cross section and axis X—X.

Figure 3:
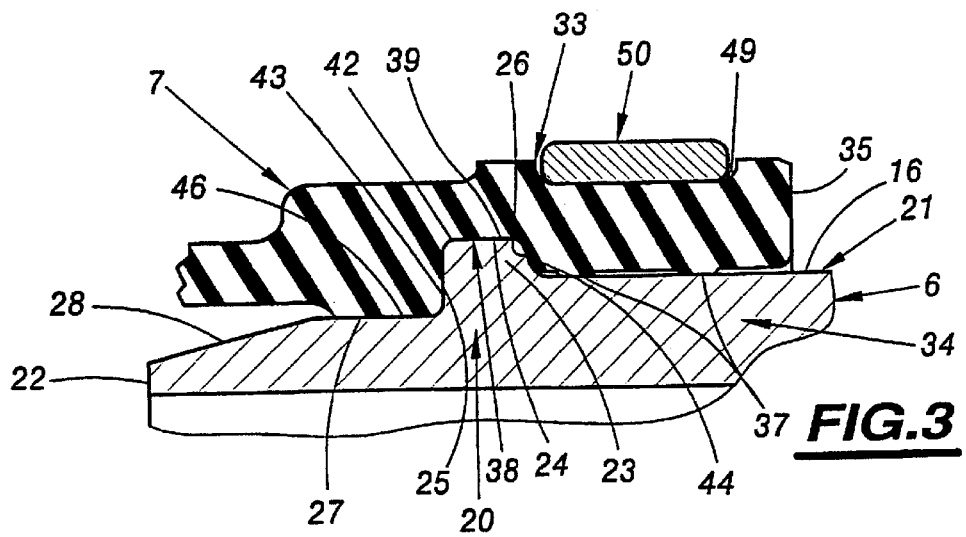

As illustrated by FIG. 3, the front flank 25 of each portion 23 of the enlargement 20 is orthogonal to the axis X—X and the rear flank 26 of each portion 23 of the enlargement 20 is inclined with respect to the radial direction, outward and toward the front of the bell housing 6.

Each front flank 25 of a portion 23 has a greater radial extent than the rear flank 26 of the same portion 23. Each front flank 25 is connected to the front edge face 22 of the bell housing 6 by, in succession, a region 27 of the surface 21, with generatrices parallel to the axis X—X, and a chamfered region 28 which is inclined with respect to the axis X—X forward and toward the inside of the bell housing 6.

The six chamfered regions 28 located forward of the portions 23 of the enlargement 20 are distributed at regular angles about the axis X—X.

The bell housing 6 has been produced by forging, and then the chamfered regions 28 have been machined by turning and the portions 23 of the enlargement 20 formed by upsetting material toward the rear of the bell housing 6. The regions 27 of the radially outer surface 21 have been formed during this upsetting. The front edge face 22 can remain, that is to say undergo no subsequent machining operation.

As can be seen in FIG. 1, a front end region 30 of the boot 7 is fixed to the first shaft 8, some distance from the tripod 3, by a clamping collar 31.

In a rear end region 33, the boot 7 has an internal cross section of a shape which in general matches that of the radially outer surface 21 of the sidewall 14 of the bell 6.

The rear end region 33 of the boot 7 is slipped over a front end region 34 of the bell housing 6 which comprises the retaining enlargement 20.

As can be seen in FIGS. 3 to 5, the rear end region 33 of the boot 7 comprises, in succession, from the rear edge face or end 35 of the boot 7, two peripheral and continuous sealing lips 37 which extend radially inward around the entire periphery of the boot 7, and a peripheral groove 38 for housing the enlargement 20 of the bell housing 6.

The groove 38 extends peripherally around the boot 7 In a similar way to the enlargement 20 around the periphery of the bell housing 6. Thus, the groove 38 has several portions 39 regularly angularly spaced apart.

The longitudinal profile of the radially inner surface of the boot 7 near the groove 38 is, except as far as the sealing lips 37 are concerned, a match for that of the radially outer surface 21 of the bell housing 6 near the enlargement 20.

Thus, the groove 38 has a bottom 42, a front flank 43 and a rear flank 44 which are of shapes which match those of the top 24, the front flank 25 and the rear flank 26 of the enlargement 20, respectively, and which are pressed against these.

Furthermore, a region 46 of the radially inner surface of the boot 7 is pressed against the region 27 of the radially outer surface 21 of the sidewall 14 of the bell housing 6.

The radially outer surface of the rear end region 33 of the boot 7 exhibits approximate symmetry of revolution about the axis X—X and, axially to the rear of the bottom 42 of the groove 38, has a groove 49 for housing a clamping collar 50. This clamping collar 50 extends axially over the sealing lips 37. The clamping collar 50 is housed with a small amount of axial clearance in the groove 49.

The seal between the rear end region 33 of the boot 7 and the front end region 34 of the bell housing 6 is provided satisfactorily by the lips 37 which are compressed around the entire periphery of the radially outer surface 21 of the bell housing 6 by the clamping collar 50.

Furthermore, the rear end region 33 of the boot 7 is retained axially in both axial directions with respect to the bell housing 6 by the enlargement 20 and the retaining groove 38.

It will be noted that the axial extent of the clamping collar, although limited, provides satisfactory retention of the boot 7 with respect to the bell housing 6 by virtue of the enlargement 20 and of the groove 38.

What is more, the machining to be performed on the bell housing 6 to allow this axial retention of the boot 7 with respect to the bell housing 6 is relatively simple to perform and the tools used are damaged relatively little.

It is interesting to note that the chamfered regions 28 from which the enlargement 20 is formed by upsetting the material of the bell housing 6 are surfaces which are usually machined on the bell housings 6 of tripot joints 1 to center the bell housing 6 during finishing by rolling the splines 12 of the shank 11 of this bell housing 6.

In the embodiment of FIGS. 1 to 5, the enlargement 20 has as many portions 23 as the sidewall 14 of the bell housing 6 has convex parts 16. The total angular extent of the enlargement 20 therefore corresponds to the total angular extent of these convex parts 16. However, as will now be described with reference to FIGS. 6 to 8, it is possible to produce a retaining enlargement 20 whose total angular extent is greater than the total angular extent of the parts 16 of the sidewall 14 farthest from the longitudinal axis X—X of the bell housing 6.

Figure 6:
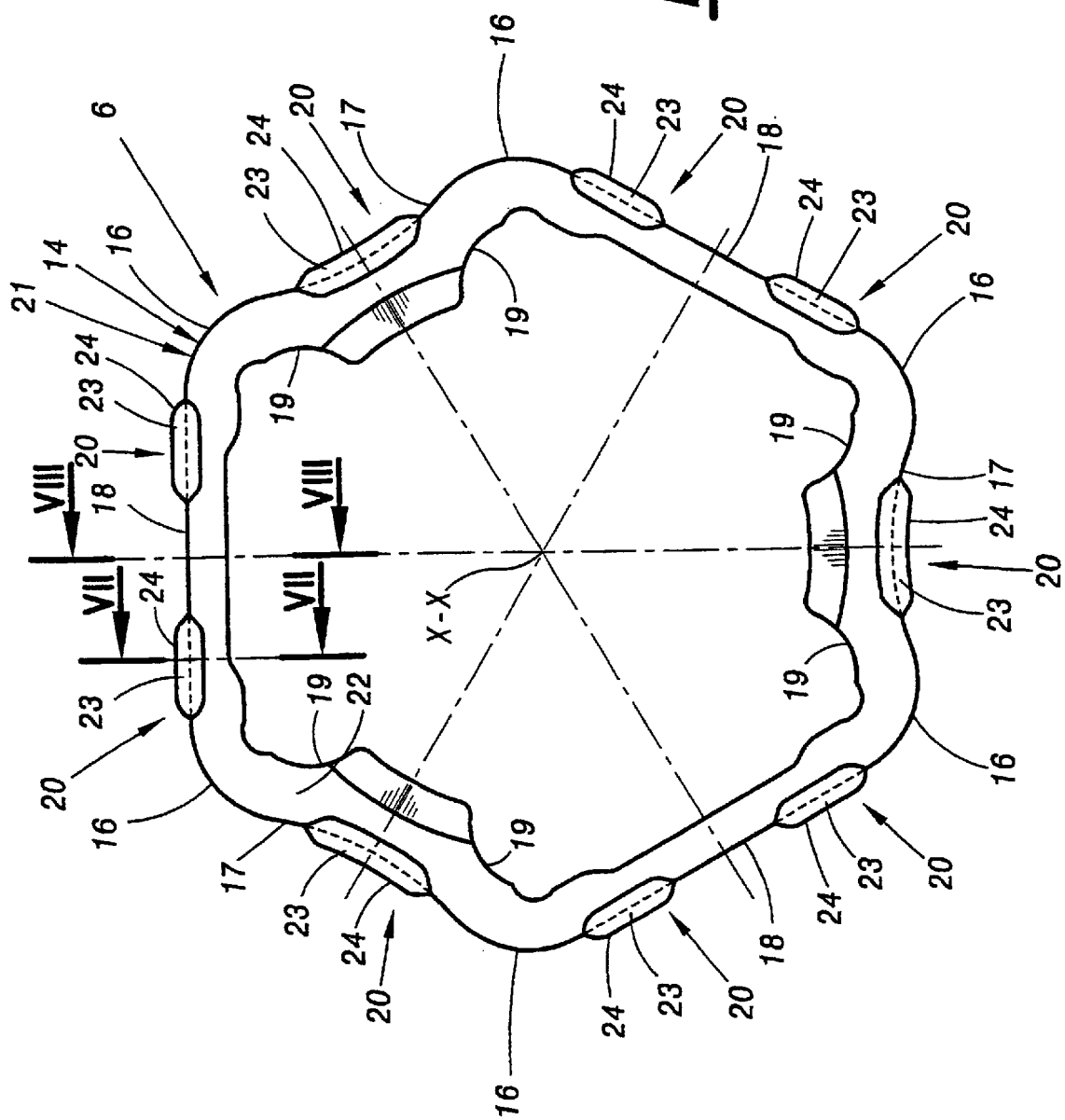
FIG. 6 is a view similar to FIG. 2 illustrating another embodiment of the transmission joint of FIG. 1, and FIGS. 7 and 8 are enlarged partial diagrammatic views in section respectively on VII—VII and VIII—VIII of FIG. 6.

FIG. 6 illustrates a bell housing 6 which differs mainly from that of FIGS. 1 to 5 in that the enlargement 20 that retains the boot 7 comprises nine portions 23. Each concave part 17 of the sidewall 14 has a portion 23 of the enlargement 20, and each flat part 18 has two portions 23 of the enlargement 20. The portions 23 of the enlargement 20 of each flat part 18 are identical and angularly spaced apart. The outer transverse outline of the concave parts 17 and flat parts 18 over most of the axial length of the wall 14 is depicted partially in dotted line in FIG. 6.

Figure 7:
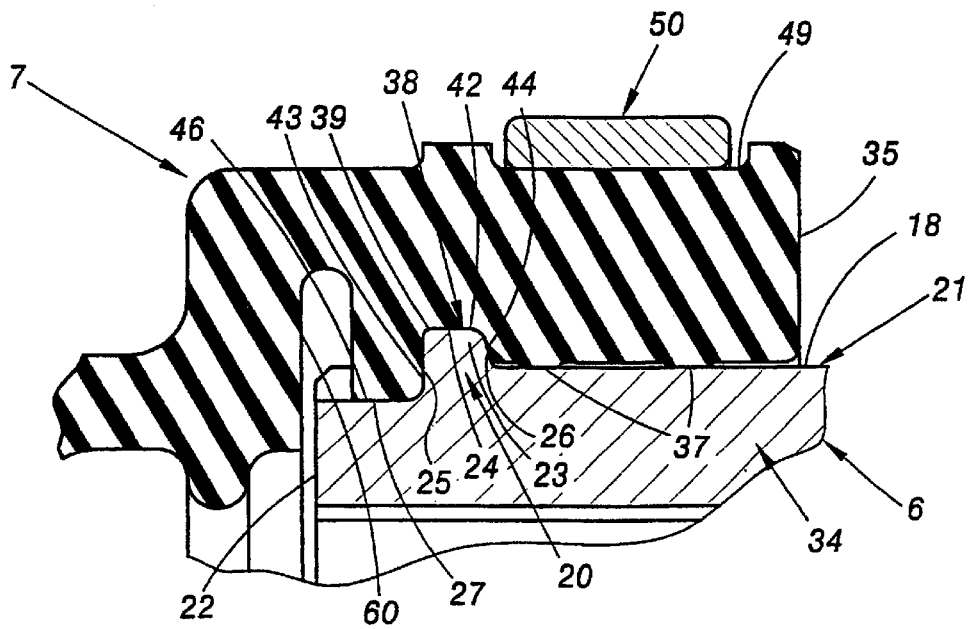

As illustrated in FIG. 7, each front flank 25 of the enlargement 20 is connected to the front edge face 22 of the bell housing 6 by a region 27 of the radially outer surface 21 of the bell housing 6. Each region 27 has generatrices parallel to the longitudinal axis X—X of the bell housing 6.

Furthermore, the boot 7 internally has an axial shoulder 60 which extends peripherally inside the boot 7 a short axial distance away from the front edge face 22 of the bell housing 6.

Figure 8:
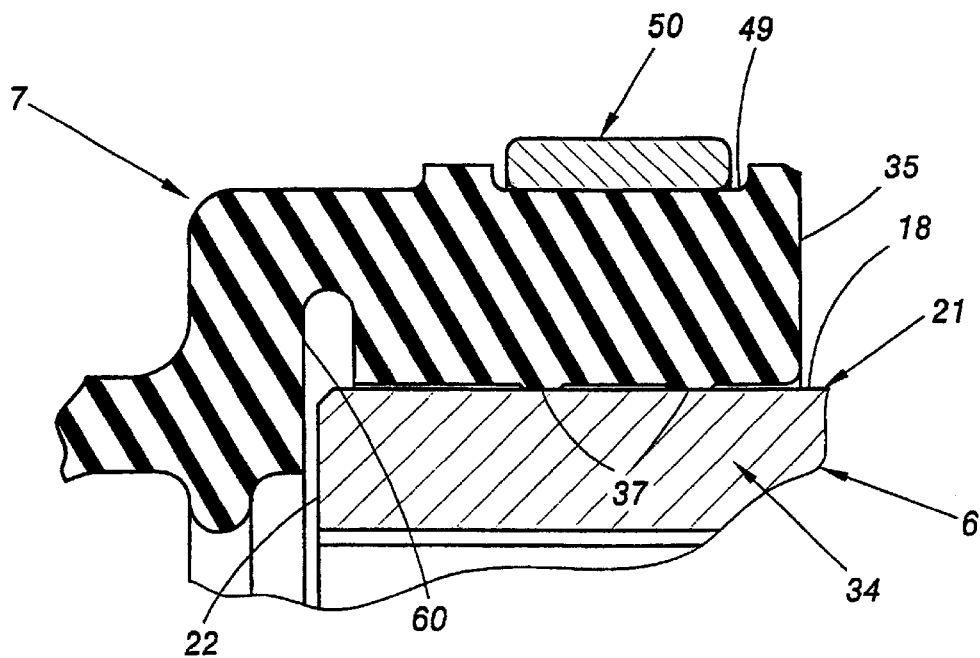

The embodiment in FIGS. 6 to 8 makes it possible to have a retaining enlargement 20 whose total angular extent is markedly greater than that of the convex parts 16 of the sidewall 14 of the bell housing 6. In addition, the portions 23 of the enlargement 20 are more closely angularly spaced than in the transmission joint of FIGS. 1 to 5.

The axial retention of the boot 7 with respect to the bell housing 6 is thus satisfactory and the risk of the boot 7 gaping when the transmission joint is in operation are limited.

It is to be noted that the axial shoulder 60 of the boot 7 may also play a part in axially retaining the boot 7 with respect to the bell housing 6 when the rear end region 33 of the boot 7 tends to move backward with respect to the bell housing 6. To play a part in such retention, the shoulder 60 comes into abutment against the edge face 22 of the bell housing 6.

In an alternative form which is not depicted, it is possible to machine the front edge face 22 of the bell housing 6 so that it comes into contact with the shoulder 60 of the boot 7 around practically its entire periphery when the boot 7 is stressed axially.

I claim:

1. A transmission joint (1) comprising:
   a first rotary member (8);
   a second (6) rotary member;
   a boot connected by a front end region (30) to the first rotary member and by a rear end region (33) to the second rotary member; and
   means for axially retaining the rear end region of the boot with respect to the second rotary member comprising a retaining enlargement (20) and a groove (38) for housing the retaining enlargement, the rear end region (33) of the boot and the second rotary member having matching transverse outlines of which the directrix curves exhibit points of inflection, wherein the enlargement (20) is situated on the periphery of the second rotary member (6) and spaced axially from the front end (22) of the second rotary member and wherein the groove (38) is formed on the periphery of the boot (7).

2. The joint as claimed in claim 1, wherein the retaining enlargement (20) and the groove (38) that houses the retaining enlargement have roughly matching longitudinal profiles.

3. The joint as claimed in claim 1, wherein the retaining enlargement (20) extends discontinuously around the periphery of the second rotary member (6).

4. The joint as claimed in claim 3, wherein the retaining enlargement (20) comprises several portions (23) spaced substantially regularly about the periphery of the second rotary member (6).

5. The joint as claimed in claim 1, wherein the groove (38) that houses the retaining enlargement (20) extends around the periphery of the boot (7) in a similar way to the retaining enlargement (20) around the periphery of the second rotary member (6).

6. The joint as claimed in claim 1, wherein the boot (7) comprises sealing members (37) located axially on the same side with respect to at least a part of the groove that houses the retaining enlargement.

7. The joint as claimed in claim 6, wherein the sealing members (37) are located axially on the same side with respect to the entirety of the groove (38) that houses the retaining enlargement (20).

8. The joint as claimed in claim 6, wherein the sealing members (37) are located axially to the rear of at least a part of the groove (38) that houses the retaining enlargement (20).

9. The joint as claimed in claim 6, wherein the sealing members (37) are located radially on the same side of the boot as the housing groove (38).

10. The joint as claimed in claim 6, comprising a member (50) for clamping the rear end of the boot onto the second rotary member, wherein the clamping member (50) is located axially, with respect to at least a part of the groove (38) that houses the retaining enlargement (20), on the same side as the boot sealing members (37).

11. The joint as claimed in claim 1, comprising a member (50) for clamping the rear end of the boot onto the second rotary member.

12. The joint as claimed in claim 1, wherein the retaining enlargement (20) is situated on a radially outer surface (21) of the second rotary member (6) and wherein the housing groove is formed on a radially inner surface of the boot (7).

13. The joint as claimed in claim 1, wherein the retaining enlargement (20) is formed on the second rotary member by upsetting the material of the second rotary member (6).

* * * * *